United States Patent
Neill et al.

(10) Patent No.: US 8,744,927 B1
(45) Date of Patent: Jun. 3, 2014

(54) APPARATUS AND METHOD OF COLORING HAIR

(75) Inventors: Ross Neill, Springfield, LA (US); Walter Claudio Zungri, Santa Barbara, CA (US)

(73) Assignee: Neill Technologies

( * ) Notice: Subject to any disclaimer, the term of this patent is extended or adjusted under 35 U.S.C. 154(b) by 0 days.

(21) Appl. No.: 13/315,784

(22) Filed: Dec. 9, 2011

Related U.S. Application Data

(63) Continuation of application No. 12/010,024, filed on Jan. 18, 2008, now abandoned.

(60) Provisional application No. 60/491,519, filed on Aug. 1, 2003.

(51) Int. Cl.
*G06Q 30/06* (2012.01)
*A61Q 5/04* (2006.01)

(52) U.S. Cl.
USPC .......................... 705/26.5; 705/400; 132/202

(58) Field of Classification Search
USPC .................................. 705/26.5, 400; 132/202
See application file for complete search history.

(56) References Cited

U.S. PATENT DOCUMENTS

| | | | |
|---|---|---|---|
| 7,877,294 B2 * | 1/2011 | Inzinna, Jr. | 705/26.1 |
| 2005/0165705 A1 * | 7/2005 | Lauper et al. | 705/500 |
| 2008/0133387 A1 * | 6/2008 | Zalta | 705/32 |

OTHER PUBLICATIONS

Clairol Introduces a Computer Imaging System to Allow Customers to View Simulated Haircolor and Makeup Changes Before They Are Made, May 12, 1986, PR Newswire.*
Prior, Molly, HCD Brings Salon Orer to PBC Aisles, Jun. 21, 2004, Gale/Cengage.*

* cited by examiner

*Primary Examiner* — Naresh Vig

(57) ABSTRACT

A customized method of determining proportional amounts of at least two or more hair treatment solutions in order to color a head of hair of a salon customer uses an algorithm to calculate changes to a formula based on selections made by a user of the system. The formula is managed through a salon operating system provided to a plurality of salon color stylists or users of the system. The algorithm for the reduction or increase of standard color formula is based on predefined application area base color amounts.

17 Claims, 7 Drawing Sheets

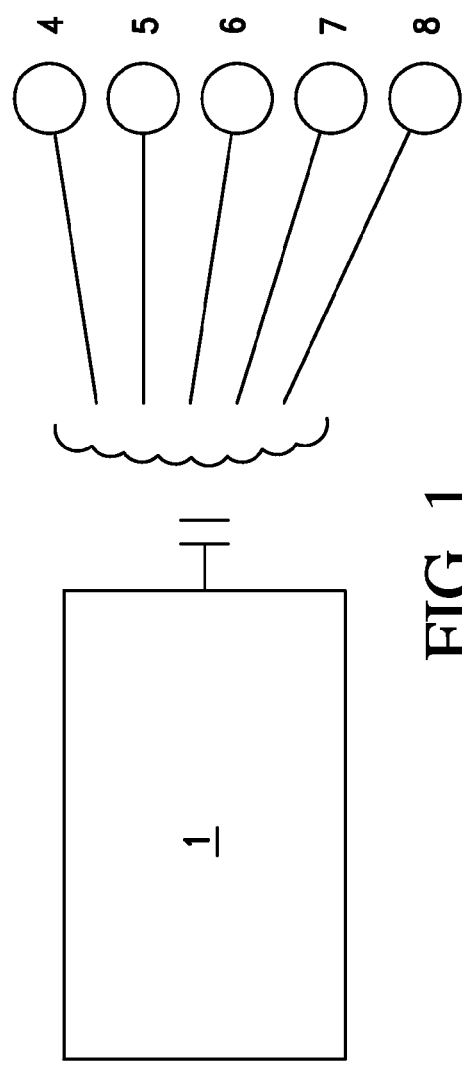
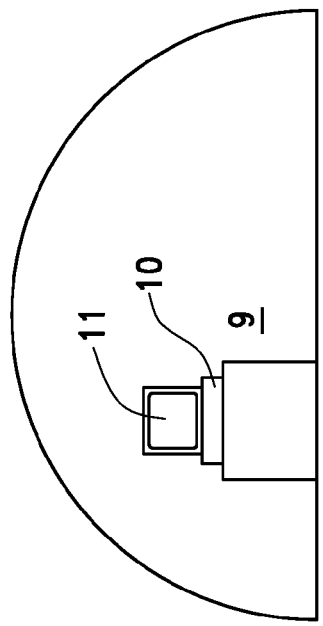

Color Lines

Aveda ▼  New  Edit  Delete
Permanent ▼  New  Edit  Delete

Permanent

Base Color
- 6 Dark Blonde
- 5 Lightest Brown
- 4 Light Brown
- 3 Medium Brown
- 2 Dark Brown
- 1 Black

NEW

Tones
- dark red orange
- dark red red
- dark red violet
- dark natural natural
- light natural natural
- light blue blue

NEW

Other
- Shampure

NEW

Developer
- 10
- 20
- 30
- 40

NEW

| View System | View Services | View Highlights | View Staff | View Color Lines |

System Defaults
Service Levels
Staff

| NEW | LAST | LEVELID | USERNAME |
|---|---|---|---|
| Nicki | Johnson(m1) | PPS Hammor | demo |
| Jerry | Martin | | |
| Susie | Smith | | |
| Ellie | Jones(m2) | PPS Hammor | |
| Nancy | Morgan | | |
| Mary | Neill | | |
| Mike | Cali(na) | PPS Hammor | |

Color Lines

Print  Operations  Check-In

Logoff Demo

FIG. 6

APPARATUS AND METHOD OF COLORING HAIR

This case is a continuation of application Ser. No. 12/010,024 Method and Apparatus for Coloring Hair, filed Jan. 18, 2008 now abandoned related to Salon Operating System Ser. No. 10/970,161 filed Mar. 3, 2004 which is based on provisional application 60/491,519 filed Aug. 1, 2003.

FIELD OF THE INVENTION

This invention relates to the field of automated controls for the hair coloring industry, and more specifically to an apparatus and method of calculating proportional amounts of hair coloring solutions for use on a measured panel of hair of a customer

BACKGROUND OF THE INVENTION

The hair coloring industry sells products on the retail and commercial levels in bottles and dispensers. For most hair salons, the use and sales of the products are monitored by inventory controls such as software accounting packages designed for salons. As each customer is treated with hair coloring solution, each leftover bottle of solution is stored or thrown away. The amount used per application for each customer is based on the amount dispensed by the salon employee.

An enormous amount of color waste is generated in today's salon due to the over mixing of color. This practice has a negative impact on the financial health of a salon and a negative affect on the environment. By reducing waste levels to zero waste, the profit margins of the business automatically grow, thus resulting in increased profitability. Waste is turned into real dollars and a healthy bottom line. With the rising costs of operating expenses, there exists a need in the salon industry for controlling the amount of solution for each individual.

There have been attempts to control the amount of hair coloring solution per application by providing single shot dispensers pumps. There have been patents for on site formulation of hair dye shades and shampoos as disclosed in Louise et al U.S. Pat. No. 5,316,481 and Hirsch et al U.S. Pat. No. 5,643,341. Measuring systems for effecting hair color are disclosed in MacFarlane et al U.S. Pat. Nos. 5,671, 735, 6,067,504, 6,314,372, 6330,341.

A hair coloring calculator is described in the patent to Scott U.S. Pat. No. 4,434,467. Scott provides a display which allows an individual to pick a hair color and the particular product line. However, there are no systems directed to a hair coloring method designed to save coloring solution from waste.

There exists a need in the salon industry for a global system used to control the amount of hair coloring dispensed for each customer based on the customer's need prior to treatment. There is a further need for a universal language in the hair coloring industry for communicating with salon employees and customers regarding each part of the head and the amount of color applied to the hair. A hair coloring system needs to be a controlled application method for calculating and applying a limited amount of solution to the hair of each individual based on area and color.

BRIEF DESCRIPTION OF THE DRAWINGS

FIG. 1 is a schematic drawing illustrating a network for using a Color Management System of the present invention.

FIG. 2 is a schematic drawing of a salon and coloring station of the present invention.

FIG. 6 is a screen shot of a display of the subject method of coloring hair.

DETAILED DESCRIPTION OF THE INVENTION

The present invention is directed to an automated apparatus for determining the amount of each solution used to prepare a customized coloring solution for a customer having their hair colored or highlighted. More specifically, the present invention is directed to an automated control console which calculates the amount and cost of each solution as it is formulated to provide a color stylist with precise measurements and price without typing or writing.

With reference to FIG. 1, a schematic drawing illustrating a network for using a Color Management System is illustrated. A central processing unit 1 is remotely located from a plurality of salons (4-8) but is connected by way of the Internet for purposes of communicating with each salon. The central processing unit includes means for reviewing data accumulated by a memory at each salon and means for assisting each salon with the data as part of a managing system.

FIG. 2 discloses a typical station at a hair salon, including a desk top, with a display 10. The display is typically a touch screen panel for use with a hard drive for running salon software, preferably, SALONBIZ®. This type of software is used to schedule appointments, keep tract of inventory and beauty specialists. Each desk top is in communication with the central processing unit 1.

Figure 3:
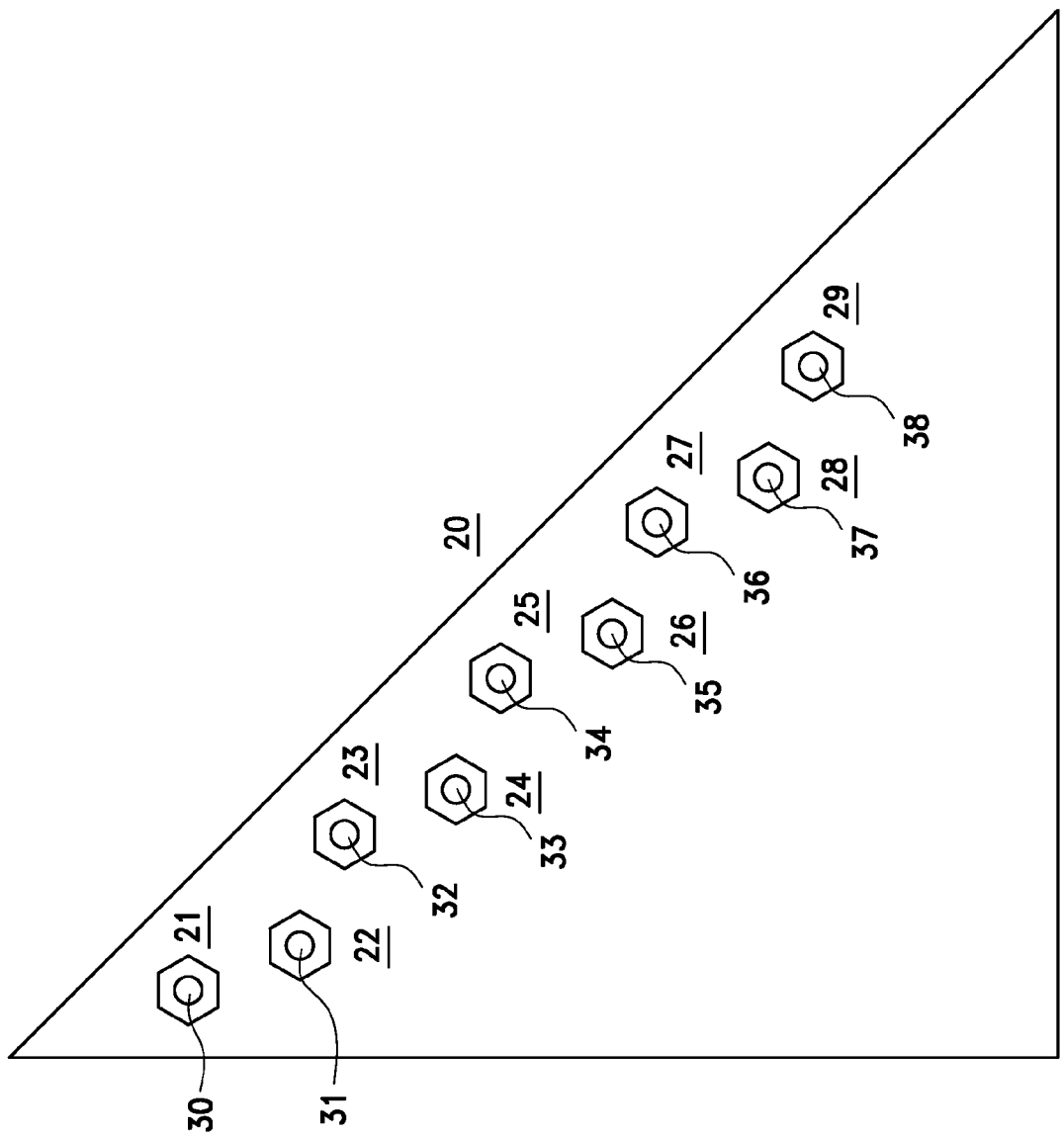
FIG. 3 is a schematic drawing of a salon and coloring stations of the present invention.
Figure 3A:
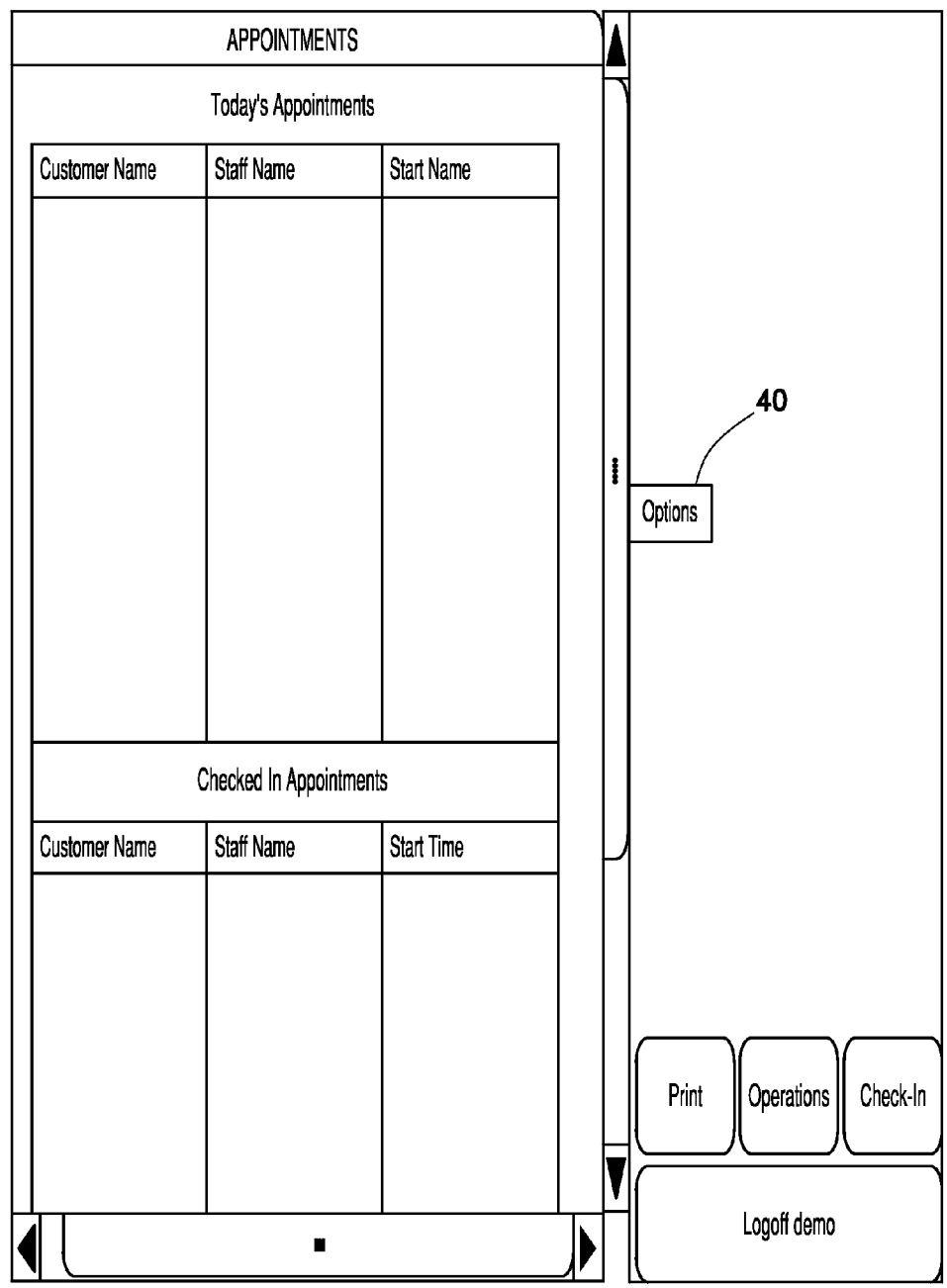

FIG. 3 discloses a color treatment system 20 of the present invention. The color treatment system of the present invention includes at least one or more color treatment stations 21-29, each having a color treatment display 30-38 each connected to a color treatment memory located in a hard drive at each color treatment station. Software, sold under the trademark COLORBIZ® is used to manage and operate the use of color bleach solutions, developers and color tones for each customer. The software further calculates the amount and cost of each solution per customer to formula a precise customized hair make over for each customer.

As each new customer makes an appointment, an identity is generated in the salon operating software and in the software used to operate and manage the amount and cost for each solution. A color specialist will typically start by pulling up the screen shot as shown on FIG. 3 which is a screen shot of a color display page listing appointments on the top bar line followed by today's appointments which provides the color specialist with means for entering a customer's name into the system along with an appointed color specialists listed under staff name. Column 3 lists a start time for each customer to begin the color treatment process. The display below today's appointments lists checked in appointments for those customers who have already began the process. After check-in, an options icon 40 on the right side permits the color specialist to prepare the customized coloring process without leaving the display or typing or writing any amounts.

Figure 4:
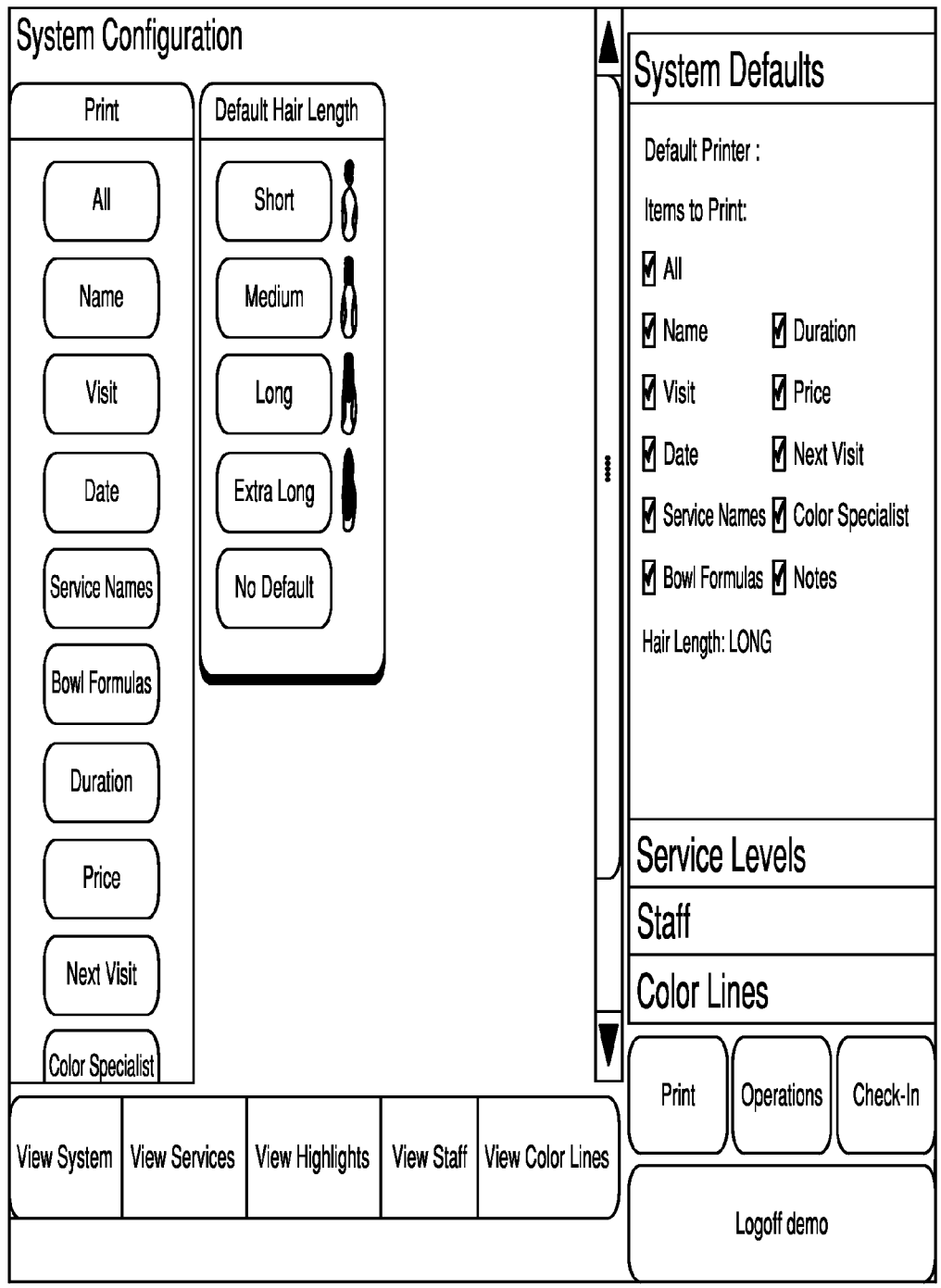
FIG. 4 is a screen shot of a display of the subject method of coloring hair.

FIG. 4 illustrates the first step in preparing a customized color treatment ticket. The screen shot illustrated in FIG. 4 discloses a system configuration with column 1 listing personal information of the customer who is under review. Column 2 provides additional information on the customer regarding hair length. Hair length is divided into four categories, short, medium, long and extra long. An icon for each category is provided on the display. A standardized table is provided to present a pre-selected volume of hair corresponding to each customer as entered on the display. The volume of hair, as indicated by each length, is used in a formula to determine an amount of each of the other solutions used to color the customer's hair.

FIG. 4 further illustrates in column 1, a series of icons after the print line including service names, bowl formulas, duration, price, next visit and color specialist. Under columns 1-2, is a horizontal bar line followed by view system, view services, view high lights, view staff and view color lines. On the right side of FIG. 4, a System Defaults column shows that the system default is set on long hair. Icon bars illustrating Service Levels, Staff and Color Lines are presented at the bottom of the System Defaults column. This screen shot is the View System shot.

Figure 5:
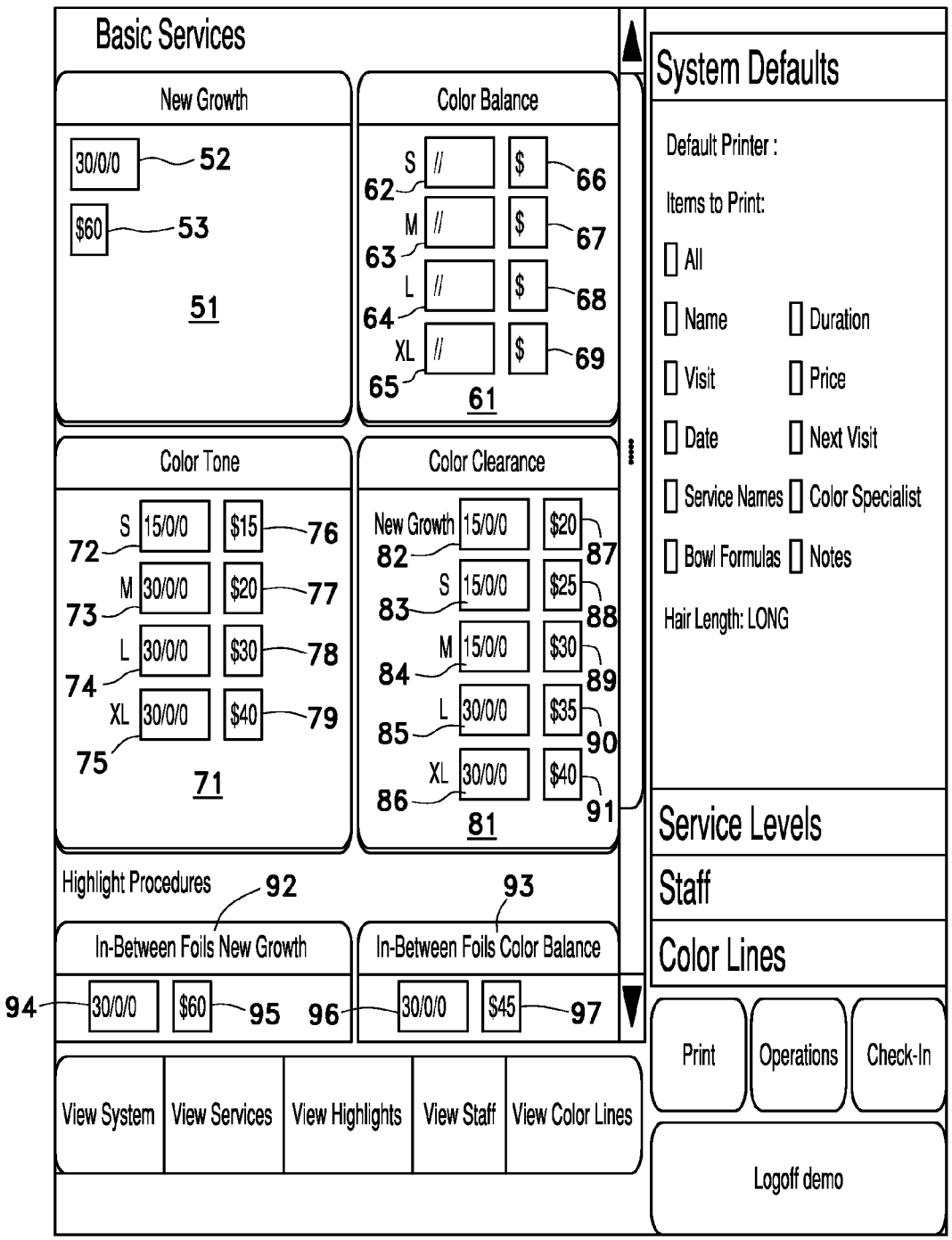
FIG. 5 is a screen shot of a display of the subject method of coloring hair.

Selecting the view services shot shown in FIG. 4, presents the screen shot shown in FIG. 5 which is the basic services menu. New growth box 51, color balance box 61, color tone box 71 and color cleanse box 81 are next presented to the color specialist for selecting each type of service. For example, new growth formula box 52 provides the color specialist with an entry for new hair growth since the last visit. Coloring new hair requires a different calculation than one for previously colored hair. New growth price box 53 computes the price based on the amount of color bleach added in new growth formula box 52. Color balance box 61 provides a selection of the four hair lengths and the cost based on the selection. Color tone box 71 and color cleanse box 81 further provide the color specialist with more options and prices based on the services requested by the customer, all based on hair length. Further shown in FIG. 5 are highlight procedures and selection icons for in between foils new growth 92 and in between foils color balance 93.

Display shot in FIG. 6 illustrates the possibilities of selections for base color, tones, or other ingredients. Also provided is a developer amount options page for the user to select and use a calculated amount of developer.

Figure 7:
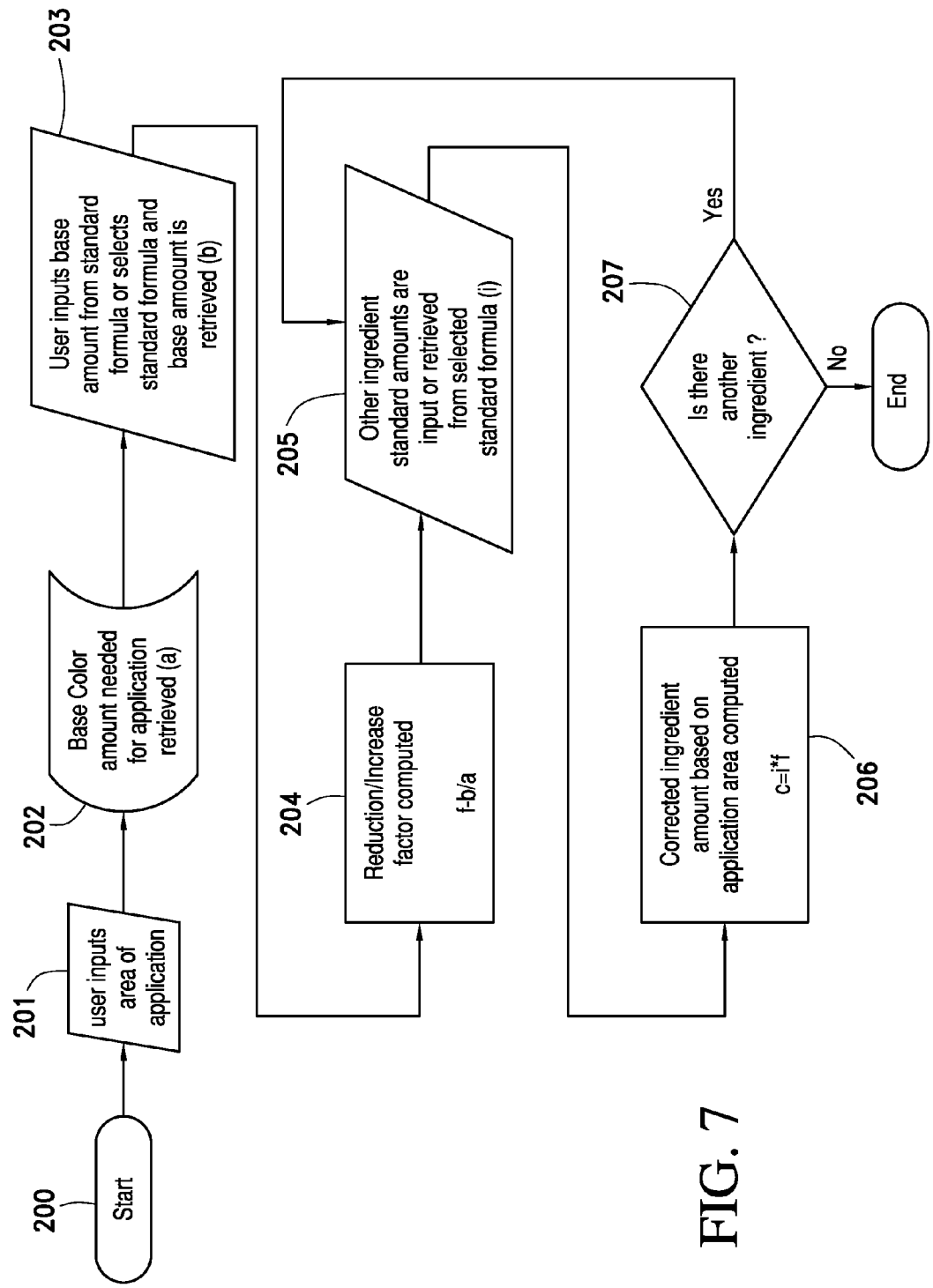
FIG. 7 is a schematic drawing illustrating the algorithm of the present invention for computing a custom formula for hair coloring.

FIG. 7 illustrates a diagram using an algorithm particularly designed for preparing a formula based on the parameters of the customer's hair. Start 200 begins the user's input of area of application. The data for the amount of the base color is retrieved at 202 and at 203 the user inputs the base amount from the standard formula or selects a standard formula and the based amount is retrieved. Next, at 204, a reduction/increase factor is computed (f=b/a). Other ingredient standard amounts are input or retrieved from a selected standard formula (i) at 205. Then, at 206, a corrected ingredient amount based on application area of the hair and head is computed and if no other ingredient is necessary 207, the final solution product amount is computed, entered and dispensed. If another ingredient is necessary, that amount is entered in the formula for processing. The algorithm for the reduction or increase of standard color formula is based on predefined application area base color amounts.

Using the following computations, wherein:
a=Base amount required for color application area (retrieved from a table)
b=Base amount in standard stored or colorist entered formula
f=Reduction/Increase factor
i=Amount of any other ingredient
c=Corrected ingredient amount based on application data.

The algorithm for the reduction or increase of standard color formula is based on predefined application area base color amounts. The colorist or user indicates the area of the head to be colored for this particular service. The user indicates the base amount (a standard non-optimized color formula amount ($b_1$) this is either manually entered by the colorist or the colorist chooses from a selection of stored formulas. The amount $b_1$ is based on standard formula amounts and does not vary based on application area. Based on the area of the head and the type of base color chose the optimal amount of base color necessary to complete the service with minimum waste ($c_0$) is retrieved. There may be multiple bases used I order to make a split base. $\{b_1, b_2, \ldots b_n\}$ Computing the formula modifier factor $f=\{b_1, b_2, \ldots b_n\}/(c_0)$ is done. Then this factor is applied to each of the bases to give the optimal quantity ($o_x$) for each base. The formula $o_x=b_x*f$ is used to calculate the optimal quantity of each base. All additional ingredients ($i_x$) (either manually entered by the colorist or from a stored formula) have the same factor applied to arrive at $p_x$, the proper portion size to create the optimized color formula amount. The formula $p_x=i_x*f$ is applied to each additional standard ingredient amount. If at any time the non-optimized amounts are changed on any ingredient, calculations are redone to compute the optimal amount of each ingredient.

The invention claimed is:

1. A method of calculating cost and dispensing a selected amount of hair coloring solution to a color specialist for coloring a customer's hair, said method including the following steps:

selecting a color treatment station, said color treatment station having a color treatment display, said color treatment display connected to a color memory located in a hard drive of said color treatment display, displaying a series of screen shots, at least one or more screen shots offering an icon for selecting an amount of solution from new growth, color balance, color tone, color cleanse, color bleach, base color and developer to dispense a coloring solution, based upon selections made by said specialist, calculating the cost and amount of hair coloring to be dispensed for the color treatment through the use of software including an algorithm, said algorithm using the following computations to calculate cost from the amount of each solution selected by said color specialist, a=Base amount required for color application area (retrieved from a table),
b=Base amount in standard stored or colorist entered formula,
f=Reduction/Increase factor,
i=Amount of any other ingredient
c=Corrected ingredient amount based on application data presenting a screen shot which displays the calculated cost and amount of hair coloring to be dispensed for the color treatment to said color specialist, and dispensing said calculated amount of coloring solution to said color specialist.

2. The method of providing a hair coloring solution as recited in claim 1, said method including the following additional step of:

displaying hair icons in said screen shot for a color specialist to select a volume of hair from at least four hair icons, said volume used to calculate said base amounts of coloring solution.

3. The method of providing a hair coloring solution as recited in claim 1, said method including the following additional step of:
   providing an icon for selecting a highlight procedure for selecting in between foils for new growth and entering an amount of new growth.

4. The method of providing a hair coloring solution as recited in claim 1, said method including the following additional step of:
   providing an icon for selecting a highlight procedure for selecting in between foils for color balance and entering an amount of color balance.

5. The method of providing a hair coloring solution as recited in claim 1, said method including the following additional step of:
   proving an algorithm for correcting the total of each amount of ingredient added and recalculating cost based on corrected amounts.

6. The method of providing a hair coloring solution as recited in claim 1, said method including the following additional step of:
   providing an icon for adding an additional ingredient after recalculating cost based on said corrected amounts.

7. The method of providing a hair coloring solution as recited in claim 1, said method including the following additional step of:
   providing standard amounts from a table of stored amounts base on an entered amount of a volume of hair entered by the color specialist.

8. A method of calculating cost and dispensing a selected amount of hair coloring solution to a color specialist for coloring a customer's hair, said method including the following steps:
   selecting a color treatment station, said color treatment station having a color treatment display, said color treatment display connected to a color memory located in a hard drive of said color treatment display,
   displaying a series of screen shots, at least one or more screen shots offering an icon for selecting an amount of solution from new growth, color balance, color tone, color cleanse, color bleach, base color and displaying selectable hair icons in said screen shot for a color specialist to select a volume of hair from at least four hair icons, said volume of hair used to calculate said base amounts of coloring solution,
   developer to dispense a coloring solution,
   based upon selections made by said specialist, calculating the cost and amount of hair coloring to be dispensed for the color treatment through the use of software including an algorithm, said algorithm using the following computations to calculate cost from the amount of each solution selected by said color specialist,
   a=Base amount required for color application area (retrieved from a table),
   b=Base amount in standard stored or colorist entered formula,
   f=Reduction/Increase factor,
   i=Amount of any other ingredient
   c=Corrected ingredient amount based on application data
   presenting a screen shot which displays the calculated cost and amount of hair coloring to be dispensed for the color treatment to said color specialist, and
   dispensing said calculated amount of coloring solution to said color specialist.

9. The method of providing a hair coloring solution as recited in claim 8, said method including the following additional step of:
   providing an icon for selecting a highlight procedure for selecting in between foils for new growth and entering an amount of new growth.

10. The method of providing a hair coloring solution as recited in claim 8, said method including the following additional step of:
    providing an icon for selecting a highlight procedure for selecting in between foils for color balance and entering an amount of color balance.

11. The method of providing a hair coloring solution as recited in claim 8, said method including the following additional step of:
    providing an icon for adding an additional ingredient after recalculating cost based on said corrected amounts.

12. The method of providing a hair coloring solution as recited in claim 8, said method including the following additional step of:
    providing standard amounts from a table of stored amounts base on an entered amount of a volume of hair entered by the color specialist.

13. A method of calculating cost and dispensing a selected amount of hair coloring solution to a color specialist for coloring a customer's hair, said method including the following steps:
    selecting a color treatment station, said color treatment station having a color treatment display, said color treatment display connected to a color memory located in a hard drive of said color treatment display,
    displaying a series of screen shots, at least one or more screen shots offering an icon for selecting an amount of solution from new growth, color balance, color tone, color cleanse, color bleach, base color and developer to dispense a coloring solution,
    selecting an icon for adding an additional ingredient after recalculating cost based on said added additional ingredient
    based upon the selections made by said specialist, calculating an amount and cost of a color treatment solution through the use of software including an algorithm, said algorithm using the following computations to calculate cost from the amount of each solution selected by said color specialist,
    a=Base amount required for color application area (retrieved from a table),
    b=Base amount in standard stored or colorist entered formula,
    f=Reduction/Increase factor,
    i=Amount of any other ingredient
    c=Corrected ingredient amount based on application data
    offering a screen shot which displays a total calculated cost of said selected total color solution and showing a screen shot to a color specialist, and
    dispensing said calculated amount of coloring solution to said color specialist.

14. The method of providing a hair coloring solution as recited in claim 13, said method including the following additional step of:
    displaying hair icons in said screen shot for a color specialist to select a volume of hair from at least four hair icons, said volume used to calculate said base amounts of coloring solution.

15. The method of providing a hair coloring solution as recited in claim 13, said method including the following additional step of:
    providing an icon for selecting a highlight procedure for selecting in between foils for new growth and entering an amount of new growth.

16. The method of providing a hair coloring solution as recited in claim 13, said method including the following additional step of:

providing an icon for selecting a highlight procedure for selecting in between foils for color balance and entering an amount of color balance.

17. The method of providing a hair coloring solution as recited in claim 13, said method including the following additional step of:

providing standard amounts from a table of stored amounts base on an entered amount of a volume of hair entered by the color specialist.

\* \* \* \* \*